United States Patent [19]

Schirle et al.

[11] Patent Number: 5,801,905
[45] Date of Patent: *Sep. 1, 1998

[54] ACTUATOR ARM WITH CUTOUTS AND MEANS FOR FILLING OR BLOCKING THE CUTOUTS

[75] Inventors: Neal Bertram Schirle, Morgan Hill; Huey Ming Tzeng, San Jose, both of Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 749,257

[22] Filed: Nov. 15, 1996

[51] Int. Cl.⁶ .................................................. G11B 5/48
[52] U.S. Cl. ............................................................. 360/104
[58] Field of Search ...................................... 360/104, 106

[56] References Cited

U.S. PATENT DOCUMENTS

| | | | |
|---|---|---|---|
| H1573 | 8/1996 | Budde | 360/104 |
| 4,071,867 | 1/1978 | Pejcha | 360/109 |
| 4,331,990 | 5/1982 | Frandsen | 360/78 |
| 4,331,991 | 5/1982 | Moreshouse et al. | 360/106 |
| 4,346,416 | 8/1982 | Riggle et al. | 360/106 |
| 4,352,133 | 9/1982 | Hager | 360/106 |
| 4,408,238 | 10/1983 | Hearn | 360/104 |
| 4,739,430 | 4/1988 | Manzke et al. | 360/106 |
| 5,014,142 | 5/1991 | Nakanishi et al. | 360/98.01 |
| 5,055,969 | 10/1991 | Putnam | 361/398 |
| 5,126,904 | 6/1992 | Sakurai | 360/103 |
| 5,268,805 | 12/1993 | Peng et al. | 360/106 |
| 5,627,701 | 5/1997 | Misso | 360/106 |

FOREIGN PATENT DOCUMENTS

| | | |
|---|---|---|
| 59-182348 | 8/1984 | Japan. |
| 61-61277 | 3/1986 | Japan. |
| 1-248372 | 1/1989 | Japan. |
| 4-79085 | 3/1992 | Japan. |
| 5-74130 | 3/1993 | Japan. |
| 2 127 610 | 9/1983 | United Kingdom. |

OTHER PUBLICATIONS

Brochure for "Mini-Wini™", Pertec Computer Corporation.

*Primary Examiner*—A. J. Heinz
*Attorney, Agent, or Firm*—Baker Maxham Jester & Meador

[57] ABSTRACT

A hard disk drive head actuator includes a plurality of arms for holding the heads over the disks. Each arm is formed with one or more cutouts, to reduce the rotational inertia of the actuator. To prevent increased viscous dissipation, or windage losses, that would otherwise be caused by the cutouts, the cutouts are filled with lightweight plastic inserts. Advantageously, filling the cutouts improves structural damping of an arm and enhances the dynamic response of an actuator assembly that incorporates one or more such arms.

18 Claims, 3 Drawing Sheets

ACTUATOR ARM WITH CUTOUTS AND MEANS FOR FILLING OR BLOCKING THE CUTOUTS

BACKGROUND OF THE INVENTION

1. Field of the Invention

The present invention relates generally to computer hard disk drives, and more particularly to head actuator arms for hard disk drives.

2. Description of the Related Art

In computer hard disk drives, several magnetic storage disks are typically coaxially stacked in a disk drive housing. To facilitate data transfer to and from the disks, a plurality of transducers, commonly referred to as "heads", are suspended between the disks. The disks are typically attached to a rotatable spindle, and as the spindle rotates to rotate the disks past the heads, data can be transferred to and from circular "tracks" on the disks that are directly opposed to the heads.

Accordingly, the heads must be held next to the disks, and they also must be moved radially inwardly and outwardly relative to the disks to position the heads over the appropriate tracks on the disks. So-called actuator assemblies have been provided for this purpose. Typical actuator assemblies include a plurality of arms, on the ends of which the heads are held. The arms in turn are integrally connected to an actuator body, and a motor is coupled to the body to move the body and, thus, to position the heads over the appropriate tracks.

It happens that to increase data transfer rates, it is advantageous that the arms be rapidly movable to thereby rapidly position the heads over the various tracks that are to be used for a particular data transfer event. To promote rapid and precise arm movement, it is further advantageous that the arms be lightweight, while nevertheless being sufficiently stiff to undertake their function of supporting the heads. It is still further desirable, however, to manufacture the arms from materials that are relatively inexpensive.

In appreciation of the above, devices have been proposed in which certain portions of an actuator arm are removed, to thereby establish what are colloquially referred to as "cutouts". It can be readily appreciated that the cutouts reduce the weight of the arm. While effective in reducing the weight of the arm, however, the cutouts also reduce the stiffness of the arm.

Furthermore, it is found that the cutouts create air turbulence and, hence, viscous dissipation, or windage power losses. More specifically, disk rotation is hampered by windage drag caused by the cutouts in actuator arms. Indeed, it is discovered that the windage losses caused by cutouts can increase aerodynamic drag significantly. Arm drag coefficients increase by 40%. This in turn undesirably requires that additional power be supplied to the motor that turns the spindle of the hard disks. The unfortunate necessity to supply greater power to overcome windage loss becomes even more pronounced with the industry trend toward ever greater disk rotation speeds to improve data transfer rates. As recognized by the present invention, however, it is possible to provide an actuator arm for a hard disk drive that is lightweight, while being relatively stiff, and while avoiding the inducement of large windage losses.

Accordingly, it is an object of the present invention to provide a lightweight actuator arm for holding one or more heads of a hard disk drive. Another object of the present invention is to provide a lightweight actuator arm for holding one or more heads of a hard disk drive that is relatively structurally stiff. Still another object of the present invention is to provide a lightweight actuator arm for holding one or more heads of a hard disk drive that does not induce large windage losses. Yet another object of the present invention is to increase the structural damping of the actuator arms to improve their vibration characteristics. Yet another object of the present invention is to provide a lightweight actuator arm for holding one or more heads of a hard disk drive that is easy to use and cost-effective.

SUMMARY OF THE INVENTION

An actuator assembly for juxtaposing a head with a hard disk in a hard disk drive assembly includes an actuator body. The actuator assembly also includes a voice coil motor (VCM) that is coupled to the actuator body for moving the body in accordance with a control signal. At least one arm is connected to the actuator body, and the arm extends outwardly from the body, with the arm defining a head end for supporting the head thereon. In accordance with the present invention, the arm is formed with at least one cutout that extends through the arm and that defines an airflow passageway. Per principles disclosed in detail below, a blocking member is engaged with arm for preventing air flow through the passageway.

Preferably, the blocking member is an insert which substantially fills the air passageway. As disclosed below, the insert is made of lightweight polymer. The air passageway defines an annular wall, and the wall is formed with at least one groove for promoting engagement of the insert with the arm. Alternatively, the blocking member can include a thin layer of lightweight material, such as tape or a polymer coating, that extends over the cutout. The actuator assembly can be used in combination with the hard disk drive, and additionally in combination with a computer.

In another aspect, a hard disk drive includes a plurality of magnetic storage disks disposed coaxially with respect to each other. An actuator body is positioned adjacent to the disks and is movable relative thereto in response to a control signal. Also, a plurality of transducers are juxtaposed with the storage disks for data transfer therebetween. Per the present invention, a plurality of actuator arms are connected to the actuator body, with each actuator arm including a head end for holding one or more transducers. Each actuator arm is formed with at least one blocked air passageway.

In still another aspect, a method is disclosed for manufacturing a hard disk drive actuator device. The method includes extruding a metal bar such that the metal bar has at least one cavity formed therethrough, with the cavity defining an axis. Then, the method envisions disposing a blocking material that has a lighter weight the metal bar in the cavity. Next, a plurality of slits are machined in the metal bar substantially perpendicular to the axis to establish a plurality of arms extending away from a body, such that each arm defines a respective cutout and such that each cutout is filled by a respective insert.

In yet another aspect, a digital processing apparatus includes a computer, a plurality of magnetic storage disks disposed in the computer coaxially with respect to each other, and an actuator body positioned adjacent the disks and movable relative thereto in response to a control signal. Also, the apparatus includes a plurality of transducers that are juxtaposed with the storage disks for data transfer between the disks and the computer. I Furthermore, the apparatus includes a plurality of actuator arms that are connected to the actuator body, with each actuator arm including a head end distanced from the body for holding one or more transducers. Importantly, each actuator arm is formed with at least one blocked air passageway.

The details of the present invention, both as to its structure and operation, can best be understood in reference to the accompanying drawings, in which like reference numerals refer to like parts, and in which:

DESCRIPTION OF THE PREFERRED EMBODIMENTS

Figure 1:
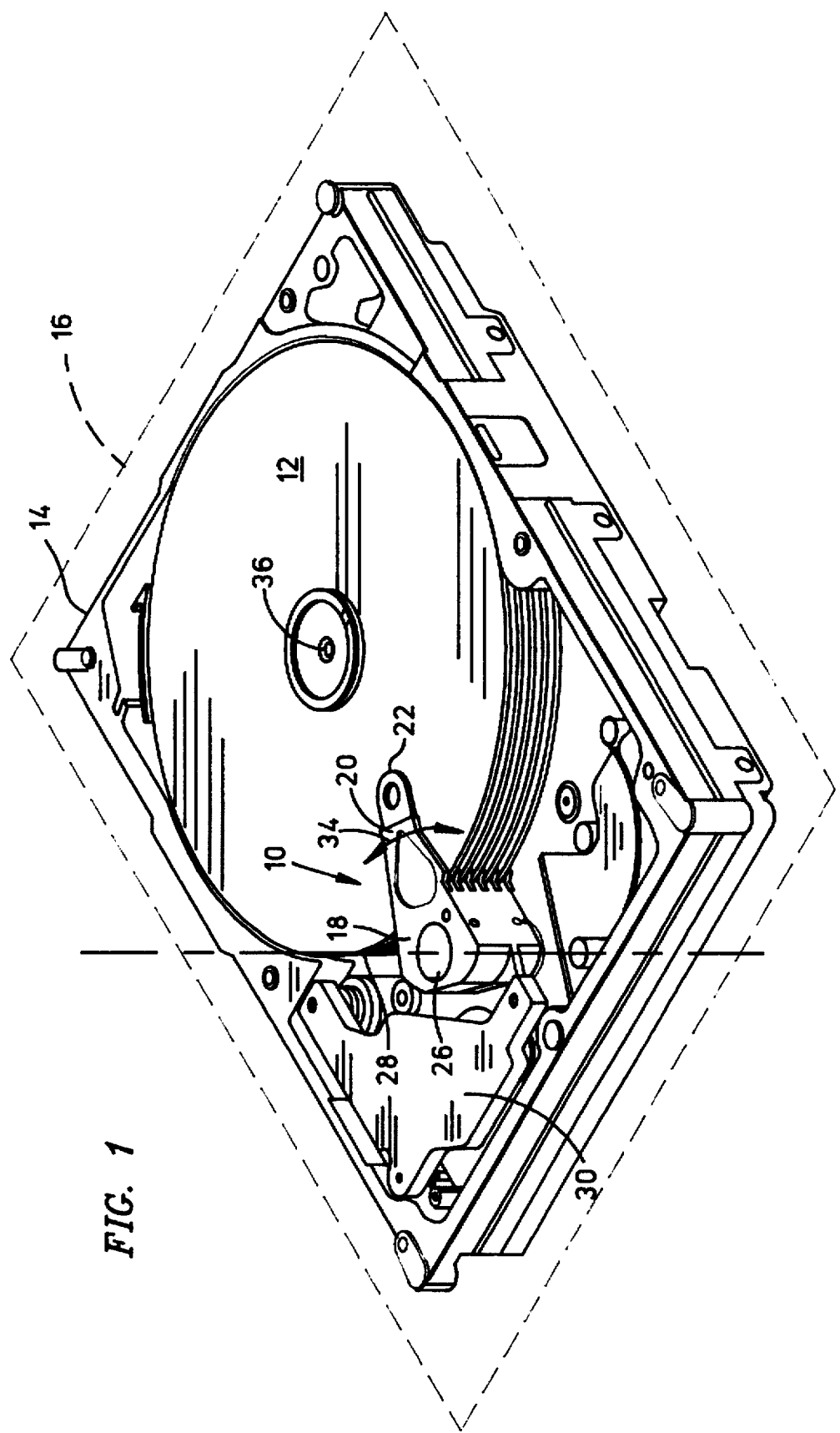
FIG. 1 is a partially schematic view of the actuator assembly in operable engagement with a hard disk drive in a computer, with portions removed for clarity.

Referring initially to FIG. 1, an actuator assembly is shown, generally designated 10, in operable engagement with a plurality of data storage disks 12 of a hard disk drive 14, of a computer 16. As shown in FIG. 1, the actuator assembly 10 includes an actuator body 18 and a plurality of actuator arms 20 extending outwardly away from the actuator body 18, with each actuator arm 20 including a respective head end 22 that supports one or more data transducers, i.e., heads (not shown) in accordance with means well-known in the art. Preferably, the actuator body 18 is unitarily made with the actuator arms 20 from a lightweight yet stiff metal such as aluminum or magnesium.

As further shown in FIG. 1, the body 18 of the actuator assembly 10 includes a hollow capstan 26 which is rotatably mounted o n the hard drive 14 for rotation about an axis 28. To rotate the capstan 26, a mover, such as a voice coil motor (VCM) 30, is operably engaged with the capstan 26. In one presently preferred embodiment, the VCM 30 is part of a so-called "Whitney" drive assembly that rotates the capstan 26 in response to a control signal from a drive controller 32.

FIG. 1 shows, for clarity, only three disks 12 and three actuator arms 20, with each actuator arm 20 being closely juxtaposed with a respective disk 12 and with a disk 12 separating adjacent actuator arms 20. It is to be understood, however, that more or fewer disks 12 and actuator arms 20 can be used in accordance with principles disclosed herein, and that as disclosed below the assembly 10 can include six (6) actuator arms 20. In any event, the disks 12 are coaxially aligned with each other, i.e., the disks 12 are stacked. likewise, the actuator arms 20 are stacked relative to each other.

In accordance with principles well-known in the art, the capstan 26 can be rotated to move the actuator arms 20 with heads 24 radially inwardly and outwardly relative to the disks 12, in the directions indicated by the double arrow 34. Accordingly, as the disks 12 are rotated by a spin motor 36, the heads 24 are positioned over data tracks on the disks 12 for data transfer between the heads 22 and data tracks.

Figure 2:
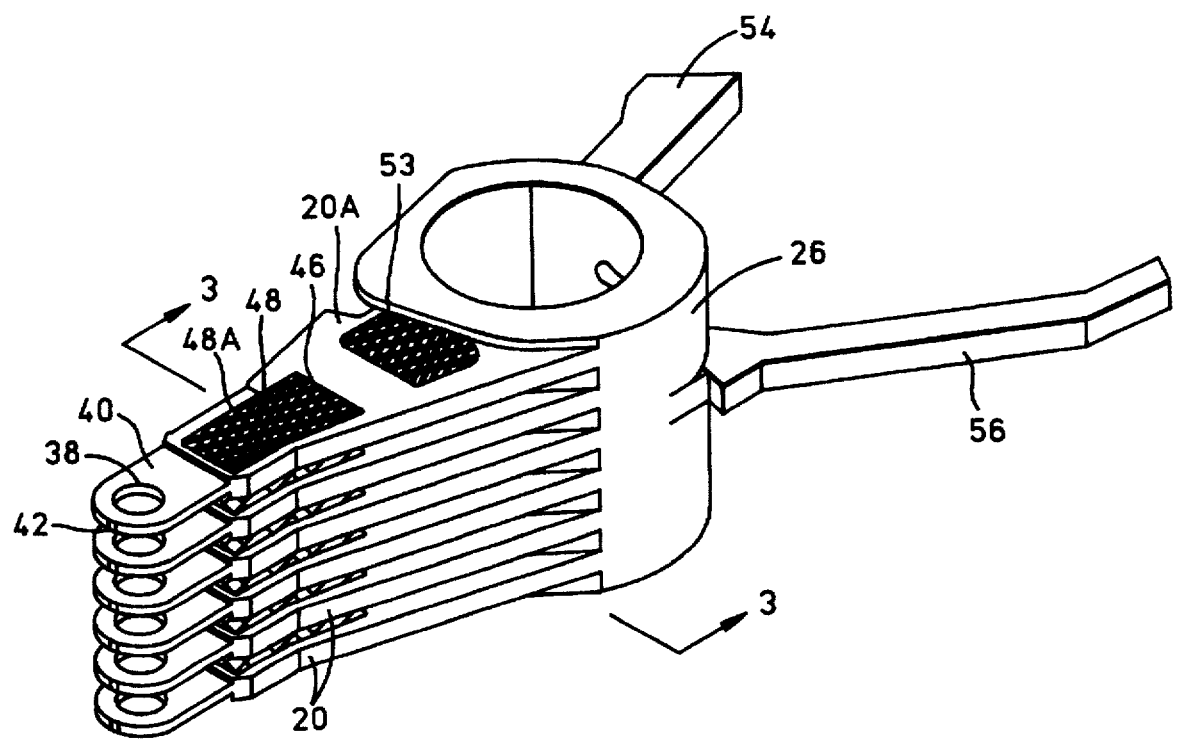
FIG. 2 is a perspective view of the actuator assembly, with the head suspension assemblies removed for clarity.

Turning to FIG. 2, a preferred embodiment of the actuator assembly 10 can be seen which incorporates six (6) actuator arms 20. It is to be understood that the actuator arms 20 are substantially identical to each other in construction and configuration. Consequently, for clarity of disclosure only the uppermost actuator arm 20A shown in FIG. 2 will be particularly described herein.

FIG. 2 shows that the actuator arm 20A is formed with a respective head suspension assembly hole 38 from a top surface 4 1) of the actuator arm 20A to a bottom surface 42 of the actuator arm 20A. As intended by the present invention, a flexure (not shown) is engaged with the head hole 38, and a head 24 (FIG. 1) is attached to the flexure. One or more heads 24 can be attached to a single actuator arm 20A, if desired.

Additionally, between the head hole 38 and the capstan 26, the actuator arm 20A is formed with a first generally parallelepiped-shaped opening, referred to herein as a first "cutout" 46, which extends from the top surface 40 to the bottom surface 42. An insert 48 is disposed in the first cutout 46, with the insert 48 substantially filling the cutout 46. Also, referring briefly to FIG. 3, top and bottom surfaces 48a, 48b of the insert 48 are flush with the top and bottom surfaces 40, 42 of the actuator arm 20A. In accordance with this invention, the insert 48 is made of a material that is lighter weight (i.e., that is less dense) than the actuator arm 20. For example, the insert 48 can be made of stiff plastic, and more particularly of a polymer such as Ultem® made by General Electric Plastics. Alternatively, the insert 48 can be made of a lightweight porous material that may include a polymer or a metal.

Figure 3:
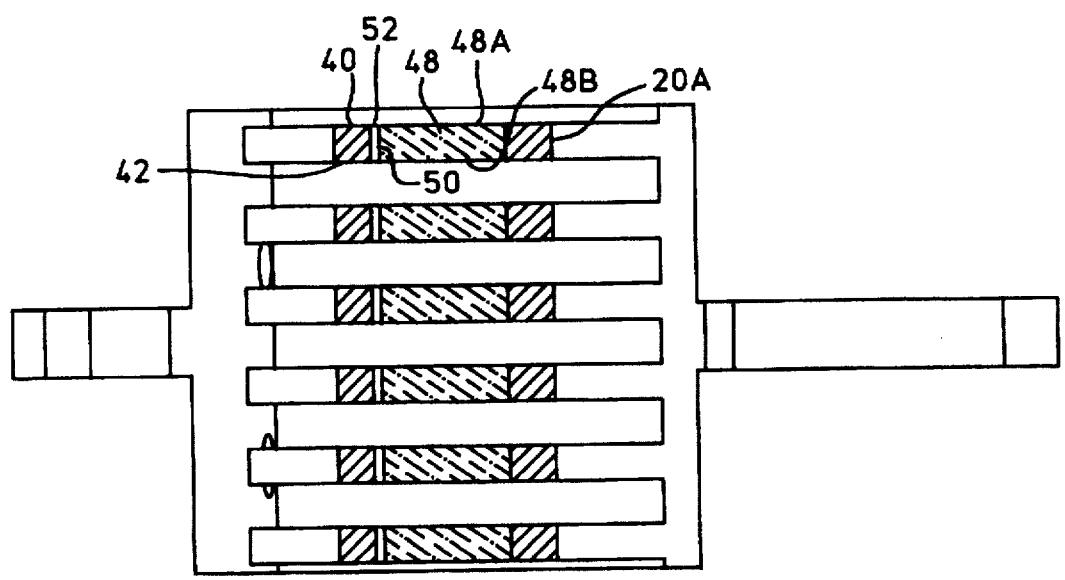
FIG. 3 is a cross-sectional view, as seen along the line 3—3 in FIG. 2.

With the above disclosure in mind and in cross-reference to FIGS. 2 and 3, it can now be appreciated that the cutout 46 defines an air flow passageway defining an annular wall 50, with the air flow passageway being blocked by the insert 48. If desired, the wall 50 can be formed with a plurality of grooves 52 that extend from the top surface 40 of the actuator arm 20A to the bottom surface 42. As envisioned by the present invention, the grooves 52 promote engagement of the insert 48 with the actuator arm 20A. Alternatively, ribs (not shown) can be formed on the wall 50 to protrude radially inwardly from the wall 50, instead of the grooves 52.

FIG. 2 also shows that the actuator arm 20A can be formed with a second cutout 53, between the first cutout 46 and the capstan 26. Like the first cutout 46, the second cutout 53 is filled with an insert that is shaped substantially identically to the second cutout 53.

Completing the description of FIG. 3, two legs 54, 56 extend outwardly away from the capstan 26 generally opposite to the actuator arms 20. As shown, the legs 54, 56 essentially establish two sides of triangle, and in accordance with means well-known in the art, the coil 30 (FIG. 1) is attached lo the legs 54, 56.

Figure 4:
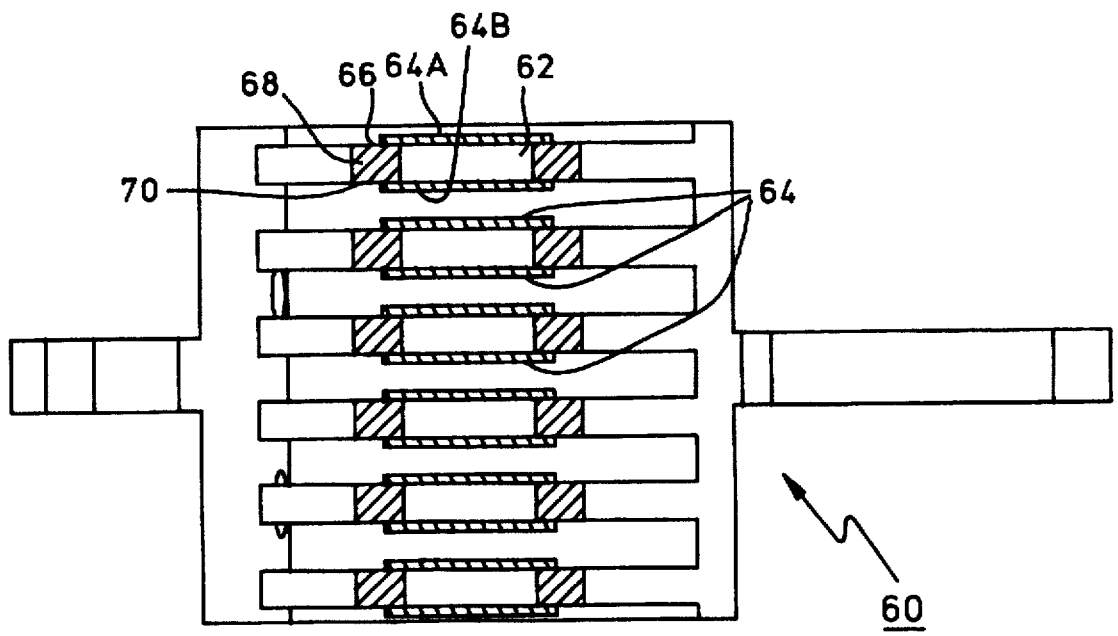
FIG. 4 is a cross-sectional view of an alternate embodiment in which the cutout blocking member is a thin layer of lightweight material, as would be seen along the line 3—3 in FIG. 2.

FIG. 4 shows an actuator, generally designated 60, that is in all essential respects identical in configuration and construction to the actuator 10 shown in FIGS. 2 and 3, with the following exception. Instead of incorporating blocking members that are inserts which substantially fill cutouts 62, the actuator 60 shown in FIG. 4 incorporates blocking members 64 that are thin layers of lightweight material.

As shown in FIG. 4, the blocking members 64 extend over respective cutout 62. Preferably, each cutout 62 is associated with a top blocking member 64a that is attached to a top surface 66 of a respective actuator arm 68. Also, each cutout 62 is associated with a bottom blocking member 64b that is attached to a bottom surface 70 of the respective actuator arm 68. The material of the blocking members 64 can be adhesive damping tape, metal tape, or mylar tape that adheres to the respective actuator arm 68. Or, the material can be a polymer coating that is deposited on the respective actuator arm 68 by dipping the arm 68 in a polymer melt. Still further, the material can be a planar-type suspension that is suspended over the respective cutout 62.

Figure 5:
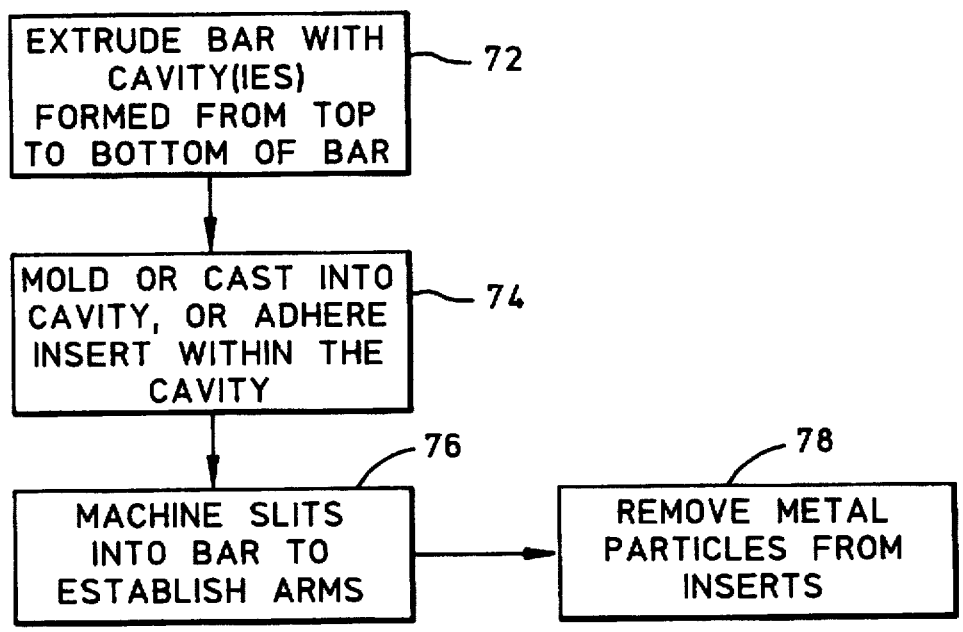
FIG. 5 is a flow chart showing the manufacturing steps of the present invention.

FIG. 5 shows the steps for making the actuator 10 shown in FIGS. 2 and 3. Starting at block 72, a metal bar is formed by extrusion, with the metal bar preferably having two cavities defining co-parallel axes. The cavities extend from the top to the bottom of the bar, and as will be appreciated momentarily, after the machining step described below each cavity establishes a respective series of cutouts 46 (FIG. 2).

Then, at block 74 the material that is to be used to establish the inserts 48 is molded or cast in the cavities to fill the cavities. Alternatively, a rod of the insert material can be inserted into the cavities with adhesive between the rod and arm material. Next, at block 76 slits are machined into the bar substantially perpendicular to the axes of the cavities. It can now be appreciated that this machining establishes the separate actuator arms 20 with respective inserts 48.

At block 78, metal particles are removed from the inserts established during machining at block 76. The removing step at block 78 can be accomplished by vapor etching, when the inserts are made of Ultem®. Alternatively, particles can be functionally "removed" at block 78 by encapsulating the particles using hot air blow or dip coating, when the inserts are made of a porous polymer.

It has been found that the invention provides actuator arms that are lightweight, hardy, and economical to manufacture. A further advantage of the invention is the increase in actuator arm structural damping that the insert material provides, which improves the dynamic response of a head actuator assembly that incorporate an actuator arm according to the invention.

While the particular ACTUATOR ARM WITH INSERTS as herein shown and described in detail is fully capable of attaining the above-described objects of the invention, it is to be understood that it is the presently preferred embodiment of the 20 present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed:

1. An actuator assembly for supporting a magnetic head in a disk drive assembly, comprising:
    an actuator body;
    at least one actuator arm connected to the actuator body, the at least one actuator arm including a head end for supporting a head thereon, the at least one actuator arm including at least one cutout extending therethrough and defining a passageway;
    a blocking member engaged with the at least one actuator arm and having a lower density than the at least one actuator arm for preventing airflow through the passageway; and
    the at least one actuator arm including a top surface and a bottom surface, the at least one cutout extending from the top surface to the bottom surface and the blocking member including a first layer of material on the top surface over the at least one cutout and second layer of the material on the bottom surface over the at least one cutout.

2. The actuator assembly of claim 1, wherein the material is adhesive tape.

3. The actuator assembly of claim 1, wherein the material is a polymer coating.

4. An actuator assembly for supporting a head in a disk drive assembly, comprising:
    an actuator body;
    at least one actuator arm connected to the actuator body, the at least one actuator arm including a head end for supporting a head thereon, the at least one actuator arm including at least one cutout extending therethrough and defining a passageway;
    a blocking member engaged with the at least one actuator arm and having a lower density than the at least one actuator arm for preventing airflow through the passageway; and
    the blocking member including an insert substantially filling the passageway.

5. The actuator assembly of claim 4, wherein the insert is made of a polymer material.

6. The actuator assembly of claim 5, wherein the passageway includes an annular wall, the wall including at least one groove for engagement of the insert with the actuator arm.

7. A disk drive, comprising:
    at least one storage disk;
    an actuator body positioned adjacent the at least one storage disk and moveable relative thereto;
    a motor coupled to the actuator body for moving the actuation body in response to a control signal;
    at least one transducer disposed for data transfer with the at least one storage disk; and
    at least one actuator arm connected to the actuator body, the at least one actuator arm including an end distanced from the actuator body for holding the at least one transducer, the at least one actuator arm including a top surface and a bottom surface and at least one passageway extending therebetween, the at least one passageway being blocked by a first respective layer of material on the top surface, covering the passageway, and a second layer of material on the bottom surface, covering the passageway.

8. The disk drive of claim 7, wherein the material is adhesive tape.

9. The disk drive of claim 7, wherein the material is a polymer coating.

10. A disk drive, comprising:
    at least one storage disk;
    an actuator body positioned adjacent the at least one storage disk and moveable relative thereto;
    a motor coupled to the actuator body for moving the actuator body in response to a control signal;
    at least one transducer disposed for data transfer with the at least one storage disk; and
    at least one actuator arm connected to the actuator body, the at least one actuator arm including an end distanced from the actuator body for holding the at least one transducer, the at least one actuator arm including a top surface and a bottom surface and at least one passageway extending therebetween, the at least one passageway being filled by an insert having a lower density than the at least one actuator arm.

11. The disk drive of claim 10, wherein the insert is made of a polymer material.

12. The disk drive of claim 10, wherein the at least one passageway includes an annular way, the annular wall including at least one groove for promoting engagement of the insert with the at least one actuator arm.

13. A digital processing apparatus, comprising:

a computer;

at least one storage disk disposed in the computer;

an actuator body positioned in the computer adjacent the at least one storage disk and moveable relative thereto;

a motor displayed in the computer and coupled to the actuator body for moving the actuator body in response to a control signal;

at least one transducer disposed in the computer for data transfer with the at least one storage disk; and at least one actuator arm in the computer and connected to the actuator body, the at least one actuator arm including an end distanced from the actuator body for holding the at least one transducer, the at least one actuator arm including a top surface and a bottom surface and at least one passageway extending therebetween, the at least one passageway being blocked by a first respective layer of material on the top surface, covering the passageway, and a second layer of material on the bottom surface, covering the passageway.

14. The digital processing apparatus of claim 13, wherein the material is adhesive tape.

15. The digital processing apparatus of claim 13, wherein the material is a polymer coating.

16. A digital processing apparatus, comprising:

a computer;

at least one storage disk disposed in the computer;

an actuator body positioned in the computer adjacent the at least one disk and moveable relative thereto;

a motor disposed in the computer and coupled to the actuator body for moving the actuator body in response to a control signal;

at least one transducer disposed in the computer for data transfer with the at least one storage disk; and at least one actuator arm in the computer and connected to the actuator body, the at least one actuator arm including an end distanced from the actuator body for holding the at least one transducer, the at least one actuator arm including a top a surface and a bottom surface and at least one passageway extending therebetween, the at least one passageway being filled by an insert having a lower density than the actuator arm.

17. The digital processing apparatus of claim 16, wherein the insert is made of a polymer material.

18. The digital processing apparatus of claim 16, wherein the at least one passageway includes an annular wall, the annular wall including at least one groove for promoting engagement of the insert with the at least one actuator arm.

* * * * *

UNITED STATES PATENT AND TRADEMARK OFFICE
CERTIFICATE OF CORRECTION

PATENT NO. : 5,801,905
DATED : September 1, 1998
INVENTOR(S) : Schirle et al

It is certified that error appears in the above-identified patent and that said Letters Patent is hereby corrected as shown below:

Column 6, line 67, change "way" to --wall--.

Signed and Sealed this

Eighth Day of December, 1998

Attest:

Attesting Officer

BRUCE LEHMAN

Commissioner of Patents and Trademarks